US007255599B1

(12) United States Patent
Chawgo et al.

(10) Patent No.: US 7,255,599 B1
(45) Date of Patent: Aug. 14, 2007

(54) IMPEDANCE MATCHED WATERPROOF CONNECTOR FOR CATV FILTER HOUSING

(75) Inventors: Shawn Chawgo, Cicero, NY (US); Noah Montena, Syracuse, NY (US)

(73) Assignee: John Mezzalingua Associates, Inc., East Syracuse, NY (US)

( * ) Notice: Subject to any disclaimer, the term of this patent is extended or adjusted under 35 U.S.C. 154(b) by 0 days.

(21) Appl. No.: 11/468,833

(22) Filed: Aug. 31, 2006

(51) Int. Cl.
*H01R 9/05* (2006.01)

(52) U.S. Cl. .................................................... 439/578

(58) Field of Classification Search ................ 439/578, 439/620; 333/185, 167–168, 172
See application file for complete search history.

(56) References Cited

U.S. PATENT DOCUMENTS 3,040,288 A 6/1962 Edlen et al
3,209,287 A 9/1965 Oxner et al
5,498,175 A 3/1996 Yeh et al.
5,630,734 A * 5/1997 Phillips, Jr. ............ 439/620.07
6,323,743 B1 11/2001 Zelenz et al.
6,794,957 B2 9/2004 Shafer et al.
6,888,423 B2 * 5/2005 Tresness et al. ............ 333/185
7,125,262 B2 * 10/2006 Saka ........................ 439/76.2
2005/0001697 A1 1/2005 Gould et al.
2005/0085102 A1 * 4/2005 Pollock et al. ................ 439/63
2005/0162238 A1 7/2005 Ho
2006/0035524 A1 * 2/2006 Johannes et al. ........... 439/620

* cited by examiner

*Primary Examiner*—Jean F. Duverne
(74) *Attorney, Agent, or Firm*—Pastel Law Firm; Christopher R. Pastel

(57) ABSTRACT

An RF filter which includes a circuit board connected to an internal frame has two end connectors connected to the frame, with a protective casing connected to the internal frame and the end connectors. Insulators in each end connector are shaped to form air pockets between the air pockets and the outer conductor portion of the end connectors. A plurality of O-rings are disposed in various locations on the insulators to prevent moisture from entering the filter. The RF filter passes the SCTE Red Dye Test and limits return loss to better than negative 20 dB.

8 Claims, 2 Drawing Sheets

IMPEDANCE MATCHED WATERPROOF CONNECTOR FOR CATV FILTER HOUSING

FIELD OF THE INVENTION

This invention relates generally to the field of filter housings used in CATV systems, and more particularly to impedance matched waterproof connectors used in such a filter housing.

BACKGROUND OF THE INVENTION

It has been the custom for many years in the CATV trap and filter industry to focus upon the hermesticity of the device housing when designing the connectors at each end of the housing. This has led to a preference for moisture blocking insulative materials such as glass and thick cross-section pieces of rubber. While these materials typically are very good at preventing moisture from entering the device housing, they create very low impedance zones within the connections which are not matched to the 75 ohm impedance of the CATV system.

While this does not prevent signal transmission to a debilitating degree in analog systems, it does cause a great deal of signal reflection, i.e., high return loss, which can cause debilitating interference in systems which operate digital programming and data within their bandwidth. While some of this reflection may be compensated for by selective tuning of the filter circuit within the housing, it is not sufficient if return loss values of −20 dB or less, i.e., −30 dB, −40 dB, etc., are desired. To achieve these improved levels of return loss, it is necessary to impedance match the connector portions of the housing as close to 75 ohms as possible.

U.S. Pat. No. 6,888,423 (Tresness et al.) and U.S. Pat. No. 6,323,743 (Zelenz et al.) both disclose a solid polypropylene insulator 96b at one end of the housing and a solid low density polyethylene insulator 95 at the other end.

U.S. Patent Application Publication No. 2005/0162238 (Ho) discloses an insulating ring 42 secured within a separating part 41 at one end of the housing.

U.S. Pat. No. 6,794,957 (Shafer et al.) discloses a solid insulator 24 at one end of the housing and a solid deformable rubber seal 20 and a solid insulator 22 at the other end.

U.S. Pat. No. 5,498,175 (Yeh et al.) discloses two insulating members 53 which go on both ends of a contact member 20, with each insulating member 53 consisting of an insulating sleeve 30, a silicone resilient member 52, and an insulating cap 50.

U.S. Patent Application Publication No. 2005/0001697 (Gould et al.) discloses a solid polypropylene insulator 96b at one end of the housing and a solid low density polyethylene insulator 95 at the other end.

SUMMARY OF THE INVENTION

Briefly stated, an RF filter which includes a circuit board connected to an internal frame has two end connectors connected to the frame, with a protective casing connected to the internal frame and the end connectors. Insulators in each end connector are shaped to form air pockets between the air pockets and the outer conductor portion of the end connectors. A plurality of O-rings are disposed in various locations on the insulators to prevent moisture from entering the filter. The RF filter passes the SCTE Red Dye Test and limits return loss to better than negative 20 dB.

According to an embodiment of the invention, an RF filter includes a circuit board connected to an internal frame; first and second end connectors connected to the frame; a protective casing connected to the internal frame and the first and second end connectors; the first end connector including a first outer conductor and containing a first inner conductor and a first insulator, wherein the first insulator is effective for creating a first air pocket between the first insulator and the first outer conductor; and the second end connector including a second outer conductor and containing a second inner conductor and a second insulator, wherein the second insulator is effective for creating a second air pocket between a portion of the second insulator and the second outer conductor.

According to an embodiment of the invention, a method for assembling an RF filter includes the steps of providing an internal frame; providing a circuit board; providing two end connectors; providing a protective casing; when the internal frame and at least one of the end connectors are one-piece, assembling another of the end connectors and the protective casing onto the internal frame, such that mechanical and electrical connectivity is formed between the end connectors, the protective casing, and the internal frame; and when the internal frame and both end connectors are one-piece, assembling only the protective casing onto the internal frame such that mechanical and electrical connectivity is formed between the end connectors, the protective casing, and the internal frame; wherein the first end connector includes a first outer conductor and contains a first inner conductor and a first insulator, wherein the first insulator is effective for creating a first air pocket between the first insulator and the first outer conductor; and the second end connector includes a second outer conductor and contains a second inner conductor and a second insulator, wherein the second insulator is effective for creating a second air pocket between a portion of the second insulator and the second outer conductor.

DETAILED DESCRIPTION OF THE PREFERRED EMBODIMENT

Figure 1:
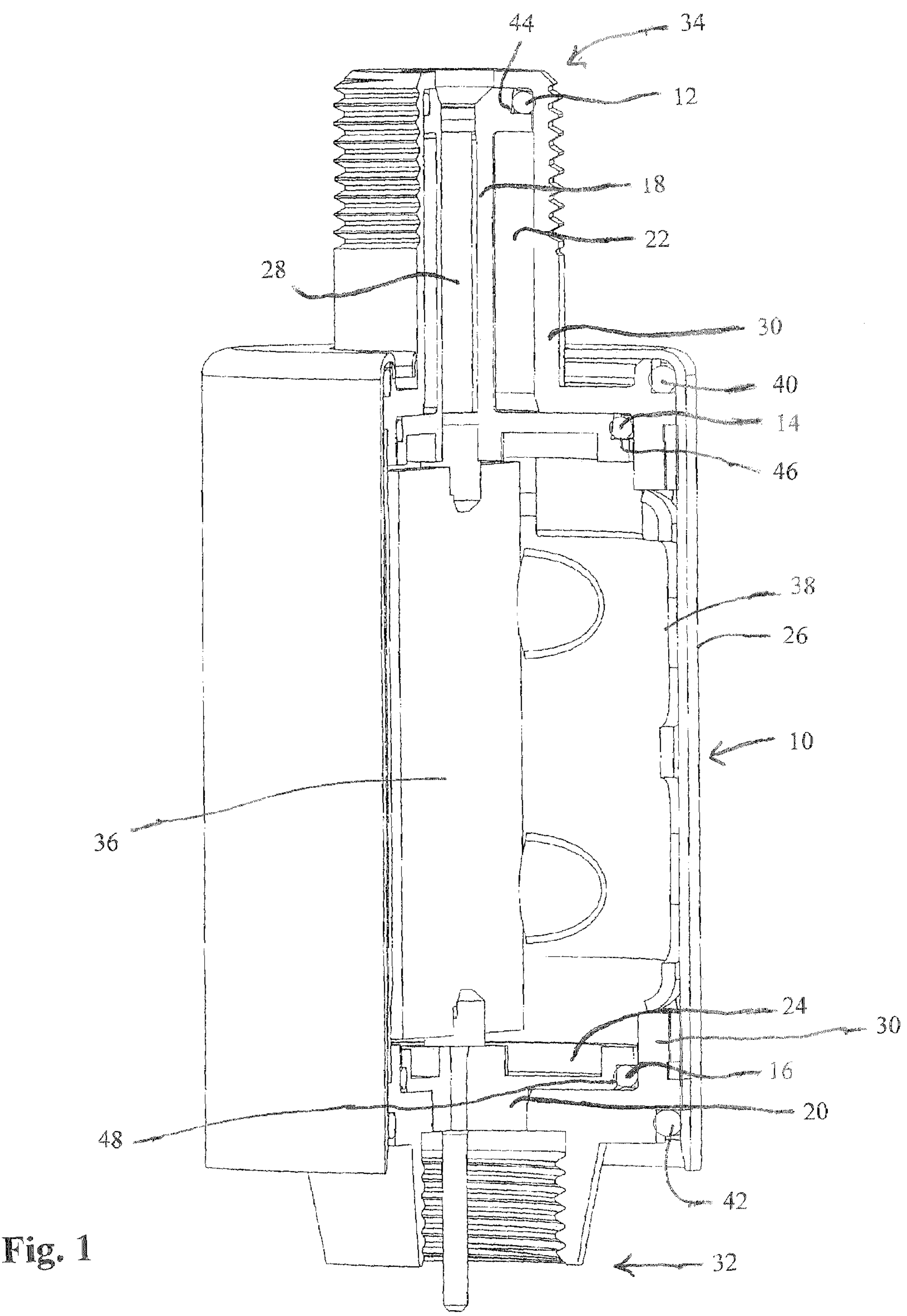
FIG. 1 shows a partially cutaway plan view of an RF filter according to an embodiment of the invention.

Referring to FIG. 1, a filter 10 includes a circuit board 36 connected to an internal frame 38. Circuit board 36 contains the electronic portions of filter 10 which typically pass frequencies within one or more specified bandwidths while blocking frequencies of other bandwidths. Internal frame 38 and circuit board 36 are preferably contained within a protective casing 26. An end connector 32 of filter 10 connects to an RF port, while an end connector 34 connects to a coaxial cable. End connectors 32, 34 include an inner conductor an inner conductor 28 and an outer conductor 30, which is usually grounded.

At end 34 of filter 10, an insulator 18 is shaped to create an air pocket 22, while at end connector 32, an insulator 20 is shaped to create an air pocket 24. Insulators 18 and 20 are preferably rigid engineering thermopolymers, and the combination of insulators 18, 20 with air pockets 22, 24 permits better impedance matching compared to the prior art.

Because insulators 18, 20 are shaped primarily to create air pockets 22, 24, various O-rings are preferably used to provide reliable moisture seals. A plurality of O-rings 12, 14, and 16 provide the necessary moisture seals for filter 10. O-rings 12, 14, and 16 are preferably fitted into corresponding shoulders 44, 46, and 48 in insulators 18 and 20. Additional O-rings 40 and 42 provide moisture seals between outer conductor 30 and protective casing 26. Thus, the present invention achieves impedance matching by foregoing the glass-to-metal and solid rubber seals typical in the prior art in favor of insulators of rigid engineering thermopolymers in combination with strategically placed O-rings. O-rings 12, 14, and 16 provide reliable moisture seals, while plastic insulators 18, 20 provide stable support of the contacts within end connectors 32, 34, thus allowing for substantial volumes of air between inner conductor 28 and outer conductor 30 for the purposes of impedance matching.

The specific diameter of the inner and outer conductors, combined with the known dielectric constants of air and in the particular plastic used, can be used to determine the characteristic impedance of the zone within the connector using the basic equation $$Z = \frac{138}{\sqrt{\epsilon}}\log\left(\frac{\phi_o}{\phi_i}\right)$$

where Z=impedance, $\epsilon$=dielectric constant, $\phi_o$=diameter of outer conductor, and $\phi_i$=diameter of inner conductor.

Using this formula and keeping practical considerations of minimum material thicknesses for plastic insulators 18, 20 and pre-loading of O-rings 12, 14, and 16 for proper sealing in mind, the shape of the connector interior results in the design shown. Not every zone within each connector is exactly 75 ohms, but the length of those zones has been minimized to the extent that structure and sealing allow. The present invention has proven to allow return loss of better than −20 dB while passing the rigors of the SCTE (Society of Cable Telecommunications Engineers) Red Dye Test.

Figure 2:
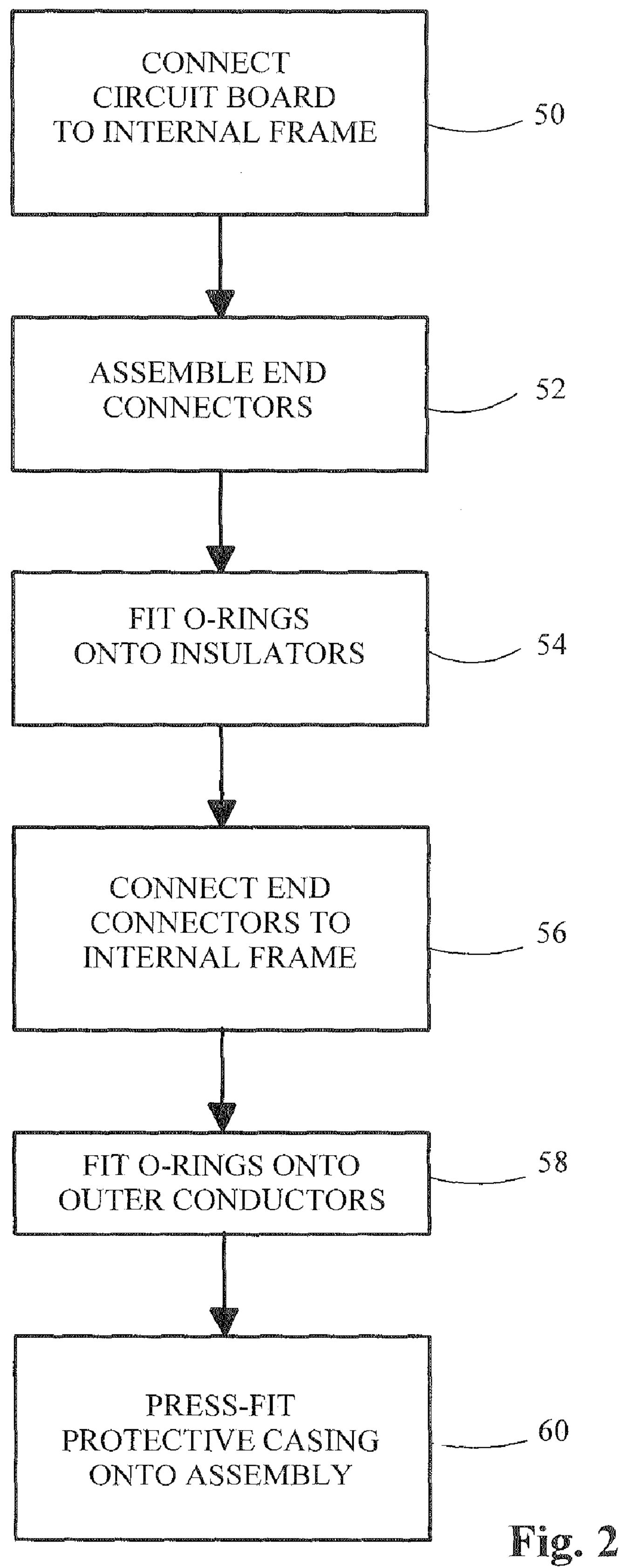
FIG. 2 shows a flow chart outlining the steps of assembling the RF filter for the present invention.

Referring to FIG. 2, a flow chart of a method for assembling RF filter 10 is shown. Circuit board 36 is connected to internal frame 38 in step 50. In step 52, end connectors 32, 34 are assembled with inner conductors 30 and insulators 18, 20 as appropriate. O-rings 12, 14, and 16 are fitted onto insulators 18, 20 as appropriate in step 54. End connectors 32, 34 are then connected to internal frame 38 and circuit board 36 in step 56, with O-rings 40, 42 fitted to outer conductors 30 in step 58. Then protective casing 26 is preferably press-fitted over the assembly to hold the components in place in step 60.

End connectors 32, 34 may be one-piece with internal frame 38 or may be separate pieces. It is also possible to make one of end connectors 32, 34 be one-piece with internal frame 38 and the other end connector be a separate piece. When internal frame 38 and at least one of end connectors 32, 34 are one-piece, the other of the end connectors and the protective casing are preferably press-fitted onto the internal frame such that mechanical and electrical connectivity is formed between end connectors 32, 34, protective casing 26, and internal frame 38. When internal frame 38 and both end connectors 32, 34 are one-piece, only protective casing 26 is preferably press-fitted onto internal frame 38 such that mechanical and electrical connectivity is formed between end connectors 32, 34, protective casing 26, and internal frame 38.

While the present invention has been described with reference to a particular preferred embodiment and the accompanying drawings, it will be understood by those skilled in the art that the invention is not limited to the preferred embodiment and that various modifications and the like could be made thereto without departing from the scope of the invention as defined in the following claims.

What is claimed is:

1. An RF filter, comprising:

a circuit board connected to an internal frame;

first and second end connectors connected to the frame;

a protective casing connected to the internal frame and the first and second end connectors;

the first end connector including a first outer conductor and containing a first inner conductor and a first insulator, wherein the first insulator creates a first air pocket between the first insulator and the first outer conductor; and the second end connector including a second outer conductor and containing a second inner conductor and a second insulator, wherein the second insulator creates a second air pocket between a portion of the second insulator and the second outer conductor.

2. An RF filter according to claim 1, further comprising:

first and second shoulders in the first insulator;

a third shoulder in the second insulator;

first and second O-rings fitted into the first and second shoulders, respectively; wherein the first and second O-rings form seals between the first insulator and the first outer conductor, thereby preventing moisture from entering the first air pocket; and a third O-ring fitted into the third shoulder; wherein the third O-ring forms a seal between the second insulator and the second outer conductor, thereby preventing moisture from entering the second air pocket.

3. An RF filter according to claim 2, wherein the filter passes the SCTE Red Dye Test.

4. An RF filter according to claim 1, wherein the filter limits return loss to better than negative 20 dB.

5. A method for assembling an RF filter, comprising the steps of:

providing an internal frame;

providing a circuit board;

providing two end connectors;

providing a protective casing;

when the internal frame and at least one of the end connectors are one-piece, assembling another of the end connectors and the protective casing onto the internal frame, such that mechanical and electrical connectivity is formed between the end connectors, the protective casing, and the internal frame; and when the internal frame and both end connectors are one-piece, assembling only the protective casing onto the internal frame such that mechanical and electrical connectivity is formed between the end connectors, the protective casing, and the internal frame;

wherein the first end connector includes a first outer conductor and contains a first inner conductor and a first insulator, wherein the first insulator creates a first air pocket between the first insulator and the first outer conductor; and the second end connector includes a second outer conductor and contains a second inner conductor and a second insulator, wherein the second insulator creates a second air pocket between a portion of the second insulator and the second outer conductor.

6. A method according to claim 5, further comprising the steps of:

providing first and second shoulders in the first insulator;

providing a third shoulder in the second insulator;

fitting first and second O-rings into the first and second shoulders, respectively; wherein the first and second O-rings form seals between the first insulator and the first outer conductor, thereby preventing moisture from entering the first air pocket; and fitting a third O-ring into the third shoulder; wherein the third O-ring forms a seal between the second insulator and the second outer conductor, thereby preventing moisture from entering the second air pocket.

7. A method according to claim 6, wherein the filter passes the SCTE Red Dye Test.

8. An method according to claim 5, wherein the filter limits return loss to better than negative 20 dB.

* * * * *